US007783978B1

(12) United States Patent
Andrews et al.

(10) Patent No.: US 7,783,978 B1
(45) Date of Patent: Aug. 24, 2010

(54) INFORMATION PROCESSING DEVICE

(75) Inventors: Anton Oguzhan Alford Andrews, Eindhoven (NL); Peter George Matthews, Eindhoven (NL); Lira Nikolovska, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 761 days.

(21) Appl. No.: 09/868,375

(22) PCT Filed: Oct. 18, 2000

(86) PCT No.: PCT/EP00/10284

§ 371 (c)(1),
(2), (4) Date: Jun. 18, 2001

(87) PCT Pub. No.: WO01/29641

PCT Pub. Date: Apr. 26, 2001

(30) Foreign Application Priority Data

Oct. 20, 1999 (EP) .................................. 99203442

(51) Int. Cl.
*G06F 3/00* (2006.01)
(52) U.S. Cl. ..................................................... 715/738
(58) Field of Classification Search ................ 345/733, 345/738, 760, 773; 715/733, 738, 760, 773, 715/744, 745, 746, 747, 734, 735, 736, 771, 715/739
See application file for complete search history.

(56) References Cited

U.S. PATENT DOCUMENTS 5,678,015 A    10/1997    Goh (Continued)

FOREIGN PATENT DOCUMENTS

EP          0767418 A1    4/1997

(Continued)

*Primary Examiner*—Thanh T Vu

(57) ABSTRACT

The invention relates to a system and information processing device for user selectably presenting information. It comprises a display screen (101) having various areas or zones for facilitating the exploration of the information. A flow zone (102) shows links or pointers (103) to various information units or content, which links continuously flow in a certain direction. The user is allowed to control the flow speed and flow direction and select any link so as to view a full presentation (108) of the related content in a presentation zone (106). The flow zone may be controlled to include only links to selected content in dependence on a user selectable filter agent (105). Personal links may be stored into and loaded from a physical token, using a token detector (113) and token area (110) displaying the personal links. The token can be used to carry personal links between information processing devices of the system according to the invention.

12 Claims, 2 Drawing Sheets

U.S. PATENT DOCUMENTS

| | | | | |
|---|---|---|---|---|
| 5,758,934 A * | 6/1998 | Flutka et al. | | 312/223.3 |
| 5,917,491 A * | 6/1999 | Bauersfeld | | 345/810 |
| 5,959,621 A * | 9/1999 | Nawaz et al. | | 715/733 |
| 6,005,767 A * | 12/1999 | Ku et al. | | 361/681 |
| 6,081,829 A * | 6/2000 | Sidana | | 709/203 |
| 6,182,098 B1 * | 1/2001 | Selker | | 715/526 |
| 6,216,141 B1 * | 4/2001 | Straub et al. | | 715/513 |
| 6,243,130 B1 * | 6/2001 | McNelley et al. | | 725/105 |
| 6,259,432 B1 * | 7/2001 | Yamada et al. | | 345/159 |
| 6,300,947 B1 * | 10/2001 | Kanevsky | | 345/866 |
| 6,305,766 B1 * | 10/2001 | Lochridge | | 312/223.3 |
| 6,392,671 B1 * | 5/2002 | Glaser | | 715/765 |
| 6,553,919 B1 * | 4/2003 | Nevin | | 108/50.01 |
| 6,629,136 B1 * | 9/2003 | Naidoo | | 709/219 |
| 6,693,652 B1 * | 2/2004 | Barrus et al. | | 715/838 |
| 6,714,975 B1 * | 3/2004 | Aggarwal et al. | | 709/224 |
| 6,832,350 B1 * | 12/2004 | Bates et al. | | 715/501.1 |

FOREIGN PATENT DOCUMENTS

| | | |
|---|---|---|
| EP | 0944218 A1 | 9/1999 |
| JP | 63242751 | 10/1988 |

* cited by examiner

INFORMATION PROCESSING DEVICE

FIELD OF THE INVENTION

The invention relates to an information processing device for user selectably presenting information. The invention further relates to a computer program product and a system for user selectably presenting information.

BACKGROUND OF THE INVENTION

With the advance of the world-wide web, there is an increasing amount of information which can be accessed online. Internet terminals are available at people's homes as well as in public places, such as schools, libraries, shopping centres, cafés etc. Internet technology is mainly used as a means for accessing information from anywhere in the world, irrespective of the location of the information source. Beside that, there is a growing interest in applying internet technology for use in local communities. For example, internet technology could allow local people to contribute information which can help, interest or entertain other local people, thus strengthening the links among members of the local community and their activities. To support such information exchange within a local community and encourage people to participate in local activities, there is a need for an easy-to-use and inviting user interface for exploring the online information.

OBJECT AND SUMMARY OF THE INVENTION

It is an object of the invention to provide an information processing device and system of the type defined in the opening paragraph, providing an improved user interface which is easy to use and encourages users to explore online information. To that end, the information processing device according to the invention comprises flow zone means for displaying a flow zone comprising flowing links to respective information units, and information selection means for presenting a selected information unit in response to a user selecting a link in the flow zone. The flow zone may be any suitable area on a display screen, e.g. a narrow band adjacent a border. The flowing links may be text strings indicating a particular topic of information or graphical icons representing such a topic. If the number of links is higher than the number of links which can be displayed in the flow zone, the flowing links disappear from the screen as soon as they reach the end of the flow zone and re-appear after a while at the beginning of the flow zone. In this way it is achieved that the links automatically attract the user's attention. The user is not required to explicitly request which links are available and subsequently browse a large set of such links. The information processing device could be built into a table for use in a public place such as a café, in which case the flow zone may run along all borders of the display screen so as to allow people to recognize the information links from multiple directions.

An embodiment of the information processing device according to the invention is characterized by the flow zone means comprising user operable flow control means (203) for controlling the flow speed and/or flow direction of the flowing links (103). This has the advantage that the user can adapt the flow speed to his personal preferences. For example, when reading is difficult because of bad lighting conditions the flow speed may be decreased. The flow control means may comprise dedicated controls, for example, to decrease and increase the flow speed.

Preferably, the user is allowed to control the flow speed by direct manipulation. An embodiment of the device according to the invention is characterized by the flow control means (203) comprising user operable point-and-select means (204) for selecting a location within the flow zone, the flow control means being arranged to stop the flow in response to the user statically selecting a location within the flow zone. The point-and-select means may comprise a computer mouse, joystick for relocating a cursor on the display screen and confirming an operation at the new location, for example by means of a button click. Alternatively, the device comprises a touch screen, allowing the user to stop the flow by touching the screen at a position within the flow zone.

An embodiment of the device according to the invention is characterized by the flow control means (203) being arranged to increase the flow speed in response to the user selecting a location and dragging said location in the flow direction. This provides an intuitive way of increasing the flow speed. The user gets the impression that the flow can be accelerated forward, just like spinning a wheel. The resulting speed may depend on whether the cursor or touch location ends within or outside the flow zone. In the former case, the acceleration may be temporary and succeeded by a deceleration and eventual halting of the flow. The flow control means may simulate inertia and friction, for example, by gradually decreasing the flow speed, instead of instantaneously stopping the flow, in response to the user touching the flow zone. Similarly, the induced speed increase may be gradual, thus strengthening the impression of spinning a wheel.

An embodiment of the device according to the invention is characterized by the flow control (203) means being arranged to reverse the flow direction in response to the user selecting a location and dragging said location against the flow direction. In this way it is achieved that the user can reverse the flow direction if, for example, he wants to return to a link which drew his attention just before it disappeared from the screen. The inversion can be achieved by the same stroking gestures as used for acceleration of the flow speed, but in the opposite direction.

An embodiment of the device according to the invention is characterized by the flow zone means (201) being arranged to alternately display links (103) and flow control areas (104), the selection of a location for controlling the flow being restricted to said flow control areas. This has the advantage that a similar location selection operation may be used to select an information unit and control the flow, dependent on whether the selected location is within a link or a flow control area. For example, if the user touches the flow zone within a flow control area the flow stops, while if he touches the flow zone within an icon which constitutes a link the related information unit may be presented.

An embodiment of the device according to the invention is characterized by the device being further arranged to display a selected information unit in a presentation zone (106), the information selection means (202) being arranged to select the information unit in response to the user selecting a link of the flow zone (102) and dragging it to the presentation zone. Preferably, the presentation zone occupies a major part of the screen, allowing a detailed presentation of the information unit. The flow zone may be located adjacent or bent around the presentation zone, allowing links to be dragged from the flow zone into the presentation zone, thereby expanding the link to the information unit it refers to. Conversely, the presented information unit may be dragged from the presentation zone to the flow zone, thereby collapsing into a link (icon).

An embodiment of the device according to the invention is characterized by the device further comprising filtering means (206) comprising user selectable filters (105) for controlling the flow zone (102) to display only links to information units which meet a requirement imposed by a selected filter. In this way, the number of links displayed in the flow zone can be reduced in that only links related to particular topics, for example 'local events', are shown.

An embodiment of the device according to the invention is characterized by the filtering means (206) being arranged to adapt the selected filter so as to display links to information units similar to the selected information unit. Such adaptation of the active filter may be achieved by dragging a link or information unit to a screen area representing the active filter, thus further restricting the current set of links in the flow zone to those links referring to information units which are similar to the one currently presented.

An embodiment of the device according to the invention is characterized by the device further comprising user-link means (207) for maintaining a plurality of preferred user-links and displaying said user-links in a further zone (110). The user is thus allowed to maintain a set of personal or user-links which may be presented in a separate area of the screen, possibly in a flowing way as well. A personal link may be dragged into the presentation zone to present the related information unit, and to the flow zone to include the personal link into the set of flowing links. Conversely, the user may drag links and information units into the area of the personal links, thus establishing a new personal link. In an alternative embodiment, the flow zone and the further zone are identical, all personal links thus being included into the set of flowing links in the flow zone.

An embodiment of the device according to the invention is characterized by the device further comprising means (208, 113) for communicating with a user supplied data carrier for storing and/or retrieving said user-links. Said means may comprise a floppy disk drive or similar means for reading and writing data carriers. Alternatively, it may comprise means for detecting the nearness of, or contact with, a physical token wherein the personal links are stored, and receiving or transmitting said links by means of, for example, transponder technology or any other suitable method of exchanging data with a data carrier. Such a token may have any shape or size, but preferably its size and weight are optimal for carrying it along. It may be combined with another utensil, such as a watch, a chip-card or a ring.

An embodiment of the device according to the invention is characterized in that the frequency of display of an information unit in the flow zone is determined by its age and/or popularity. Information units which are frequently selected, will occur more often in the flow zone than information units which are less frequently selected. Additionally, the frequency of display is affected by its age. Information units which have been created only recently will be presented more often than older units. Note that age and popularity have opposite effects. An older but popular unit will be presented quite often, while a recently created unit which is never selected will be displayed less often. Eventually, old and unpopular information units may 'die', which means that they will not be displayed again.

An embodiment of the device according to the invention is characterized by the flow control means (203) being arranged to control the flow of at least a subset of the flowing links in accordance with a relocation of the device, said subset of the flowing links being anchored to a specific location. Information units can thus be assigned to a specific location, for example a bus stop or a shop window. Such information units can only be presented if the device is nearby the specific location. In a preferred embodiment the device is a portable device. For example, the device could be a hand-held device, possibly integrated with a mobile computer or telephone. The position of the device may be determined by means of, for example, a GPS component. If the device is moved within a certain distance from the location, the device 'becomes aware' of the assigned information unit and presents a link to the unit in the flow zone, thus enabling the user to view its content. In an alternative embodiment there are two or more stages, wherein at relatively large distances between the location and the device the links are displayed in the flow zone, but the user is not yet allowed to view its content. The user is thus encouraged to actually go to the specific location. The flow zone, or only a part of it, may represent a map of the environment which shifts in accordance with the device's movements, similar to a street map in a car navigation device. Information units anchored to various locations within the environment are projected into the map. Another part of the flow zone may show flowing links to information units which are not anchored to specific locations, for example as a kind of 'river' adjacent or through the map. The anchored information may be stored on an information processing device at the location to which the information is anchored. Awareness of the anchored information can then be accomplished by means of wireless communication between the information processing device and the portable device. Alternatively, the anchored information is only virtually present, so not actually stored, at said location. The portable device has access to the information via a network, but only if the portable device is near the anchorage location.

The invention further relates to a system comprising devices of the type as defined above and physical tokens for carrying data between said devices. The devices may constitute or be integrated with semi-electronic bulletin boards etc., and be a part of a café table, a mirror or a door etc. The invention also relates to a computer program product enabling a general purpose computer, when executing said computer program product, to function as a device according to the invention.

BRIEF DESCRIPTION OF THE DRAWINGS

These and other aspects of the invention are apparent from and will be elucidated, by way of a non-limitative example, with reference to the embodiment(s) described hereinafter. In the drawings, FIG. 1 schematically shows a screen presentation of an embodiment of the information processing device according to the invention.

DESCRIPTION OF EMBODIMENTS

Figure 1:
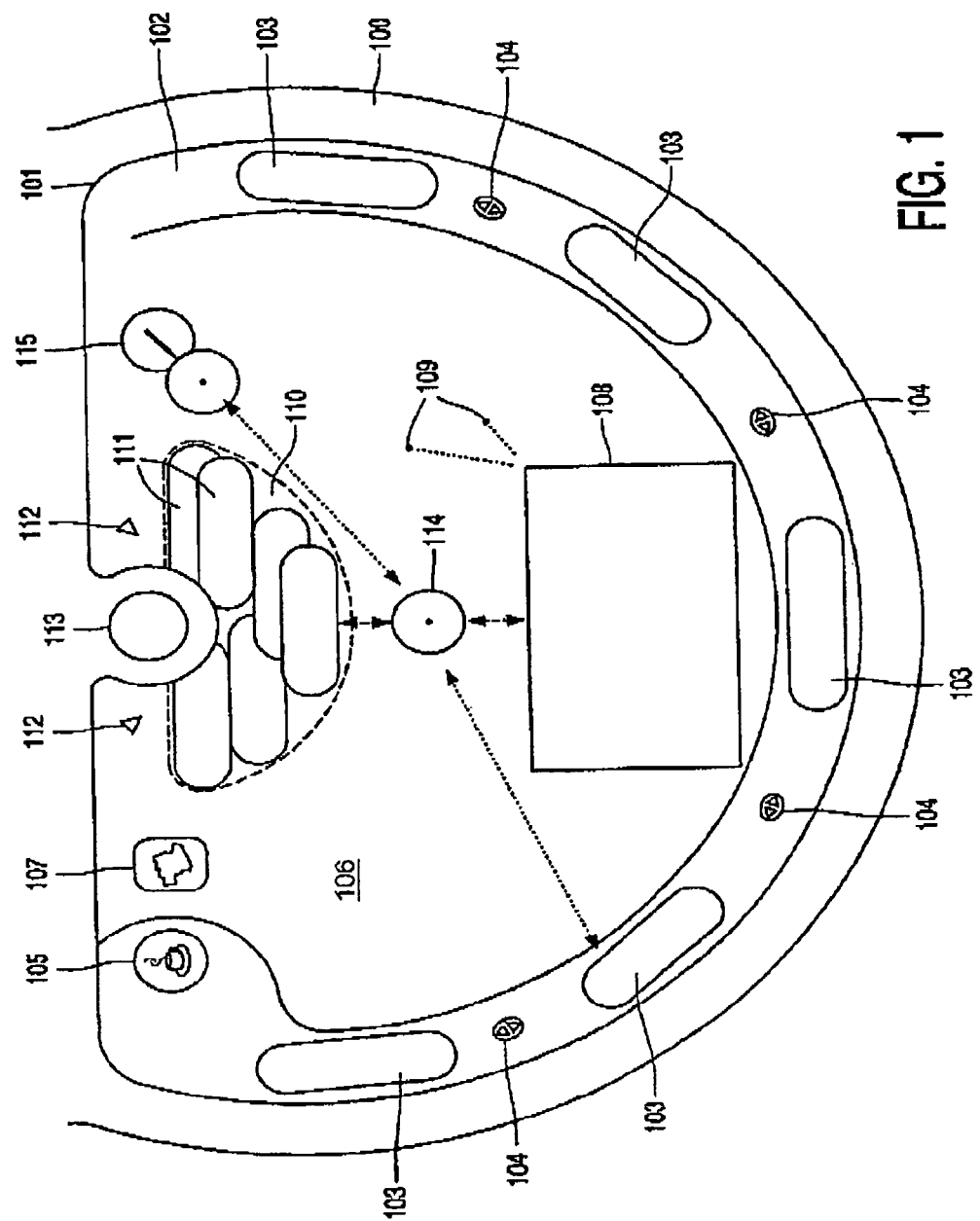

FIG. 1 shows a part 100 of the upper side of a table, for example a coffee corner table, having a built-in information processing device and touch screen 101 according to the invention. The table has a round or oval shape and the touch screen occupies half of the table top 100. The borders of the touch screen 101 follow the edge of the table top 100. Alternatively, the touch screen 101 may be rectangular and covered partially to create the impression of a curved shape. The touch screen 101 comprises a flow zone 102, a presentation zone 106, an agent zone 105, a mode zone 107, a token zone 110 and an annotation zone 115

The outermost area of the touch screen 101 comprises the flow zone 102 which presents information links 103 which by default flow at a current speed from left to right. Each link comprises a text string or graphical icon representing the related information unit. In a more advanced embodiment a link may present moving pictures and/or sound. Between each pair of links 103 a flow control area 104 is displayed, which enables the user to control the flow speed and/or flow direction. If the user touches the touch screen 101 at any one of the flow control areas 104 the flow stops, allowing the user to study the currently displayed links more carefully. In another mode, touching a flow control area 104 results in a de-acceleration and eventual halting of the flow, thus creating the impression of friction. In a more advanced embodiment the touch screen further comprises means for measuring the pressure exerted by the user's finger, and touching a flow control area 104 results in a deacceleration in dependence on the measured pressure. If the user touches a flow control area 104 and drags it with a stroking gesture into the flow direction, the flow speed increases, the acceleration being dependent on the speed of the stroking gesture. If the stroking gesture ends outside the flow zone 102, the flow speed remains at the higher level, or, in an alternative embodiment, gradually decreases to the original level. If the stroking gesture ends inside the flow zone 102, the flow stops or deaccelerates, dependent on whether friction is simulated.

A stroking gesture against the flow direction causes a change of the flow direction while the flow speed depends on the speed of the stroking gesture.

If the user touches an information link 103, the link expands to a full presentation 108 of the related information unit, which is performed in the presentation zone 106. In an alternative embodiment the user needs to explicitly drag a link 103 into the presentation zone 106, which does away with the necessity of separate flow control areas. The presentation zone 106 preferably occupies a major and central area of the touch screen 101. The actual presentation 108 has a fixed position and orientation within the presentation zone 106. In an alternative embodiment the position and orientation may depend on the start and/or end position of the dragged link 103. For example, if the link 103 was dragged to the left side of the presentation zone 106 of FIG. 1, the orientation of the presentation 108 may be optimized for a viewer sitting at the left side of the table top 100. Dragging a presentation 108 within the presentation zone 106 may have the same effect. The presentation 108 can include any type of information, such as text, graphics, moving pictures and sound. Associations 109 linked to particular content are also shown in the presentation zone 106 and may be expanded to a full presentation by touching them.

The agent zone 105 is located in the upper left of the touch screen 101. Here, the currently active filter agent will be represented and displayed. For example, the owner of a coffee corner may install a default filter agent selecting information links relating to events taking place in or in the neighborhood of the coffee corner. Touching the agent zone 105 may select a next filter agent from a list of agents, or may cause a list of available filter agents to be displayed, allowing the user to select an appropriate one. Selection of a new agent causes the agent zone 105 to show an icon representing the new agent and the flow zone 102 to include only links to information units meeting the criteria imposed by the newly selected agent. A link 103 or a presentation 108 may be dragged into the agent area 105 to refine the current filter, so as to select content which is similar to the content dragged into the agent area 105. Dragging a link 103 or a presentation 108 causes the object to take an intermediate presentation form 114, which can then be dragged to the desired location. For example, touching the presentation 108 causes it to be minimized into an icon 114, after which it may be dragged to the filter zone 105 or to the flow zone 102.

A mode selection zone 107 allows the user to select another mode, such as a tablecloth mode, a TV mode or a game mode. Selection of a mode proceeds in a manner similar to the selection of a filter agent.

The token zone 110 is located in the upper center of the touch screen 101. It surrounds a small physical dish-like island or token detector 113 where actual tokens (not shown), carrying personal information links, can be placed. If a token has not been placed on the island 113, the token zone 110 will appear to be empty. If a loaded token is placed, the personal links stored in the token will be retrieved and displayed in the token zone 110, preferably as a carousel shaped rapid serial visual presentation (RSVP). This technique can be used to get a quick overview of a relative large volume of predominately image based content items, thus effectively forming a rotating carousel. Two controls 112 allow the content of the token zone 110 to be riffled in two opposite directions. The personal links may be dragged from the token zone 110 to the presentation zone 106, the flow zone 102, the agent zone 105 and the annotation zone 115.

In an alternative embodiment the token zone 110 and the flow zone 102 are integrated, whereby the personal links are displayed upon selection of a personal agent.

The annotation zone 115 is located in the upper right of the touch screen 101. Content from the presentation zone 106, the flow zone 102 or the token zone 110 can be dragged into this zone to be annotated. This will cause an annotation space and annotation tool options such as keyboard, pen or voice (not shown) to be displayed in the presentation zone 106. If the annotation zone is touched (i.e. content is not dragged into it), the annotation space and annotation tool options will be displayed, enabling new content to be created. Selection of the keyboard option causes a virtual keyboard to be displayed, while selection of the pen option allows the user to use a dedicated pen for entering textual or graphical data. Selection of the voice option activates a built-in microphone, allowing the user to enter a speech annotation.

The tokens can be used to store and transport personal links between similar information processing devices according to the invention. Such information processing devices may have all the features of the above embodiment or only some of said features. For example, an information processing device according to the invention may be integrated in an interactive bulletin board hanging on a wall. Such an embodiment is, due to its size and location, less suitable for full interaction with a single user, and may comprise only the presentation zone 106, the token zone 110 and the token detector 113. Using such a device, a user may create a personal link to information which may interest him, store the personal link into a token and carry it to another device according to the invention offering the functionality and privacy to explore the information.

Figure 2:
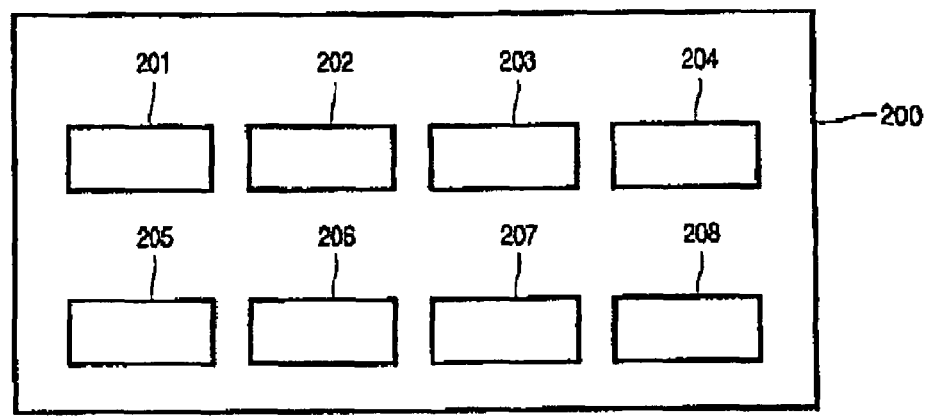
FIG. 2 shows a diagram of an information processing device according to the invention.

FIG. 2 shows a diagram of an information processing device according to the invention.

The information processing device 200 comprises flow zone means 201, information selection means 202, flow control means 203, point-and-select means 204, a display screen 205, filtering means 206, user-link means 207 and detection means 208. The flow zone means 201 perform the selection and display of information links in the flow zone 202. The flow control means 203 enable the user to control the flow speed and/or flow direction of the information links in the flow zone 202. The point-and-select means 204 may comprise a computer input device such as a mouse or joystick, or a touch sensitive layer over the display screen 205. The means 204 enable the user, inter alia, to select information links so as to start a full presentation of the related content. The filtering means 206 enable the user to select and apply a filter acting on the set of available information links. The user-link means 207 control the token zone 110 to display personal tokens obtained from a token detected by the detection means 208 or obtained by dragging information units to the token zone 110.

Figure 3:
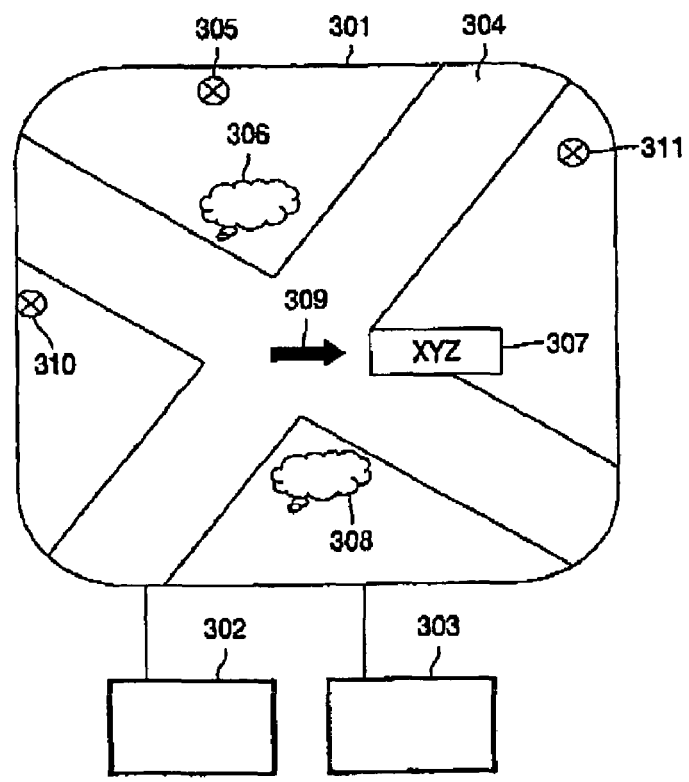
FIG. 3 shows an example of a screen representation of a street-map on an information processing device according to the invention.

FIG. 3 shows an example of a screen representation of a street-map on a information processing device according to the invention. On a display screen 301 of a presentation device a street-map 304 is displayed representing the direct environment of the information processing device. This is accomplished by means of positioning means 302, which may, for example, include a GPS receiver and mapping means for storing or downloading map data for generating the street-map 304. Presentation control means 303 are provided for controlling to which extent the user has access to the information units. Various representations of information units are depicted in FIG. 3. The position of the information processing device is indicated by the black arrow 309, i.e. close to the street-corner which is the anchorage location of information unit 307. The screen representation of information unit 307 ('icon' XYZ) is supposed to be representative of its content. The user may request a full presentation if he wishes.

The information units 306 and 308 anchored at the other street corners are represented by small cloud call-outs, to make the user aware of their existence, and giving only limited information about their contents, e.g. only the type of the respective information units. The user would have to go to their respective locations to get more information by means of their representative icons, and eventually through their full presentation.

Information units 305, 310 and 311 which are even further away from the information processing device are represented by small symbols which just make the user aware of their existence but say nothing about their content.

In a further embodiment, the street-map 304 is presented in a fish-eye view mode, showing much detail in the center, and showing a large deformed part of the remote environment with less details near the edges of the display screen. Alternatively, the information processing device comprises zooming means for generating various zoomed-in and zoomed-out views of varying degrees of detail. In a zoomed-out view, all representations of information units (even the closest ones) may be small 'awareness' symbols in order to keep the screen comprehensible.

The street-map 304 is continuously updated in accordance with the relocations of the presentation device, and dependent on the distances between the information processing device and the various anchorage locations, representations of information units change from informative to less informative and vice versa, or appear and disappear completely. The street-map 304 thus constitutes a flow zone in itself. Additionally, a flow zone of non-anchored information units may be provided, for example as a kind of river adjacent the street-map.

In summary, the invention relates to a system and information processing device for user selectably presenting information. It comprises a display screen (101) having various areas or zones for facilitating the exploration of the information. A flow zone (102) shows links or pointers (103) to various information units or content, which links continuously flow in a certain direction. The user is allowed to control the flow speed and flow direction and to select any link so as to view a full presentation (108) of the related content in a presentation zone (106). The flow zone may be controlled to include only links to selected content in dependence on a user selectable filter agent (105). Personal links may be stored into and loaded from a physical token, using a token detector (113) and token area (110) displaying the personal links. The token can be used to carry personal links between information processing devices of the system according to the invention.

Although the invention has been described with reference to particular illustrative embodiments, variants and modifications are possible within the scope of the inventive concept. Thus, for example, the various screen areas discussed above may be located at different parts of the screen. The flow zone may comprise information links flowing in multiple directions simultaneously. The invention can be implemented by means of hardware comprising several distinct elements, and by means of a suitably programmed computer. In the device claim enumerating several means, several of these means can be embodied by one and the same item of hardware.

The word 'content' is used where information (units) or information links are referenced. The word 'comprising' does not exclude the presence of other elements or steps than those listed in a claim. In the claims, any reference signs placed between parentheses shall not be construed as limiting the claim.

A 'computer program' is to be understood to mean any software product stored on a computer-readable medium, such as a floppy-disk, downloadable via a network, such as the Internet, or marketable in any other manner.

The invention claimed is:

1. A graphical user interface for use with a data processing device, comprising:
   a touch screen for stroking by a user;
   a plurality of user responsive display elements for displaying on the screen, the elements comprising:
      a flow zone comprising a list of flowing links displayed around a periphery of the screen and a flow control means responsive to appropriate strokes made on the touch screen by the user within the flow zone to selectively change flow speed and flow direction of the flowing links; and
      a presentation zone for presenting information selected from the flowing links as a presentation.

2. The interface of claim 1, wherein the display elements further comprise at least one flow control element, a respective flow control element being disposed adjacent to each flowing link.

3. The interface of claim 1, further comprising a plurality of control zones disposed together for effecting control of other display elements.

4. The interface of claim 3, wherein the control zones comprise
   an agent zone for selecting filtering agents for filtering contents of the flow zone;
   a mode zone for altering a format of other zones; and
   an annotation zone for annotating information in the presentation zone.

5. The interface of claim 1 further comprising at least one token zone for displaying personal links, wherein the personal links may be dragged to other zones to affect what is displayed in the other zones.

6. The interface of claim 5, wherein the token zone is in the form of a carousel.

7. A table comprising the user interface of claim 1 and adapted for a respective user to sit adjacent to said flow zone.

8. A table according to claim 7, wherein said touch screen is an integral part of said table.

9. A table according to claim 7, wherein said table includes an upper and horizontal table side, and said touch screen is disposed horizontally within said upper table side.

10. A table according to claim 9, wherein said touch screen is an integral part of said upper table side.

11. An information processing device for exploring information by a user, comprising:
- a display screen to display a plurality of flowing links within a flow zone, each of the flowing links being linked to respective information units for display as a presentation in a presentation zone of the display screen; and
- a controller that is responsive to user input events within the flow zone to selectively change flow speed and flow direction, wherein the flow speed changes in response to user input events that include selecting a location of the display screen with an input device and dragging the selected location in the flow direction.

12. An information processing device according to claim 11, wherein the flow direction is reversed in response to the user selecting a location and dragging the selected location against the flow direction.

* * * * *